(12) United States Patent
Mansfield et al.

(10) Patent No.: US 9,729,496 B2
(45) Date of Patent: Aug. 8, 2017

(54) PERPETUAL MUSIC

(71) Applicant: Forget You Not, LLC, Waban, MA (US)

(72) Inventors: Richard J. W. Mansfield, Cambridge, MA (US); Nissim Shani, Waban, MA (US); Daniel Shani, Waban, MA (US)

(73) Assignee: Forget You Not, LLC, Waban, MA (US)

( * ) Notice: Subject to any disclaimer, the term of this patent is extended or adjusted under 35 U.S.C. 154(b) by 0 days.

(21) Appl. No.: 14/835,181

(22) Filed: Aug. 25, 2015

(65) Prior Publication Data

US 2017/0063770 A1    Mar. 2, 2017

(51) Int. Cl.
| G06F 15/16 | (2006.01) |
| H04L 12/58 | (2006.01) |
| G06Q 50/00 | (2012.01) |
| G06F 17/30 | (2006.01) |

(52) U.S. Cl.
CPC ........ *H04L 51/32* (2013.01); *G06F 17/30654* (2013.01); *G06Q 50/01* (2013.01)

(58) Field of Classification Search
CPC .......................... H04L 51/32; G06F 17/30654
USPC ......................................... 709/204, 223–224
See application file for complete search history.

(56) References Cited

U.S. PATENT DOCUMENTS

| 7,266,767 | B2 | 9/2007 | Parker |
| 7,499,897 | B2 | 3/2009 | Pinto et al. |
| 7,562,058 | B2 | 7/2009 | Pinto et al. |
| 7,725,300 | B2 | 5/2010 | Pinto et al. |
| 7,730,003 | B2 | 6/2010 | Pinto et al. |
| 7,933,762 | B2 | 4/2011 | Pinto et al. |
| 8,165,853 | B2 | 4/2012 | Pinto et al. |
| 8,170,841 | B2 | 5/2012 | Pinto et al. |
| 8,721,441 | B1 * | 5/2014 | Chen ...................... A63F 13/814 463/35 |
| 8,751,273 | B2 | 6/2014 | Pinto et al. |
| 8,892,446 | B2 | 11/2014 | Cheyer et al. |
| 2005/0234762 | A1 | 10/2005 | Pinto et al. |
| 2009/0265382 | A1 * | 10/2009 | Freiman ................ G06Q 10/06 709/206 |
| 2012/0016678 | A1 | 1/2012 | Gruber et al. |
| 2013/0297710 | A1 * | 11/2013 | Luber ...................... H04L 51/02 709/206 |
| 2014/0310780 | A1 * | 10/2014 | Siwik ...................... H04L 51/18 726/4 |
| 2014/0344956 | A1 * | 11/2014 | Garben .................. G06F 21/10 726/30 |

* cited by examiner

*Primary Examiner* — Philip B Tran
(74) *Attorney, Agent, or Firm* — Fish & Richardson P.C.

(57) ABSTRACT

A method includes engaging with a second person to render a song on behalf of a first person using a digital representation of the first person; and on behalf of the first person and using the digital representation of the first person, while rendering the song with the second person, providing a natural language response to a question or statement from the second person based on information received from or about the first person.

28 Claims, 15 Drawing Sheets

PERPETUAL MUSIC

BACKGROUND

A typical user of a social networking website communicates with other users of the social networking website by posting information about himself or information of interest to other users of the social network website in a manner that is accessible to the other users. For example, a user of a social networking website might post background information about himself, such as current job or activity information; information about events attended, such as concerts; events the user plans to attend, such as travel vacation sites; or personal events, such as birthdays or anniversaries. A user may also post information about recent acquisitions, such as the purchase of a new automobile or smartphone. Other users who have access to the user's posted information may contact the user to comment or review information about common shared interests or for other reasons.

SUMMARY

In an aspect, a computer-implemented method includes engaging with a second person to render a song on behalf of a first person using a digital representation of the first person; and on behalf of the first person and using the digital representation of the first person, while rendering the song with the second person, providing a natural language response to a question or statement from the second person based on information received from or about the first person.

Embodiments can include one or more of the following features.

The method includes presenting the digital representation of the first person.

The digital representation of the first person includes one or more of an audio representation, a still image representation, or a video representation of the first person.

Engaging with the second person to perform the song comprises rendering the song with the second person at a level of rendering at which the first person renders the song.

The method includes determining the level of rendering of the first person.

The method includes determining the level of rendering of the first person based on a previous observation of the first person rendering the song Engaging with the second person to render the song includes presenting a gesture or physical action during the rendering of the song.

The method includes presenting the gesture or physical action in a video or multimedia display.

The method includes determining the gesture or physical action based on information received from or about the first person.

The method includes determining the gesture or physical action based on a previous observation of the first person rendering the song.

The method includes presenting the gesture or physical action in response to a question, statement, or action from the second person.

The method includes determining the gesture or physical action based on the question, statement, or action from the second person.

The method includes presenting the gesture or physical action in response to an event that occurred during the song.

The method includes presenting a still or video image of the first person while rendering the song with the second person.

The method includes inviting the second person to sing the song.

The method includes determining an identity of the second person based on information indicative of the identity of the second person previously provided by the first person.

The method includes receiving a request from the second person to render the song.

The method includes determining whether to accept the request from the second person.

The method includes accepting the request if information previously provided by the first person includes information indicative of the identity of the second person.

Providing the natural language response comprises providing at least a portion of a digitized life history previously provided by the first person.

The method includes determining the portion of the digitized life history based on the question or statement from the second person.

Providing the natural language response comprises providing the natural language response in a manner associated with the first person.

The method includes determining the manner in which to provide the natural language response based on the information received from or about the first person.

The manner associated with the first person includes one or more of a manner of speaking by the first person, a manner of rendering the song by the first person or a gesture used by the first person.

The manner of speaking includes one or more of voice of the first person, an accent of the first person, or a tone of voice of the first person.

The method includes engaging with the second person to render the song on behalf of the first person when the first person is no longer alive or no longer competent.

These and other aspects, features, implementations, and advantages, and combinations of them, can be expressed as methods, apparatus, systems, components, program products, business methods, and means or steps for performing functions, or combinations of them.

Other features, aspects, implementations, and advantages will become apparent from the description, the drawings, and the claims.

DETAILED DESCRIPTION

Figure 1:
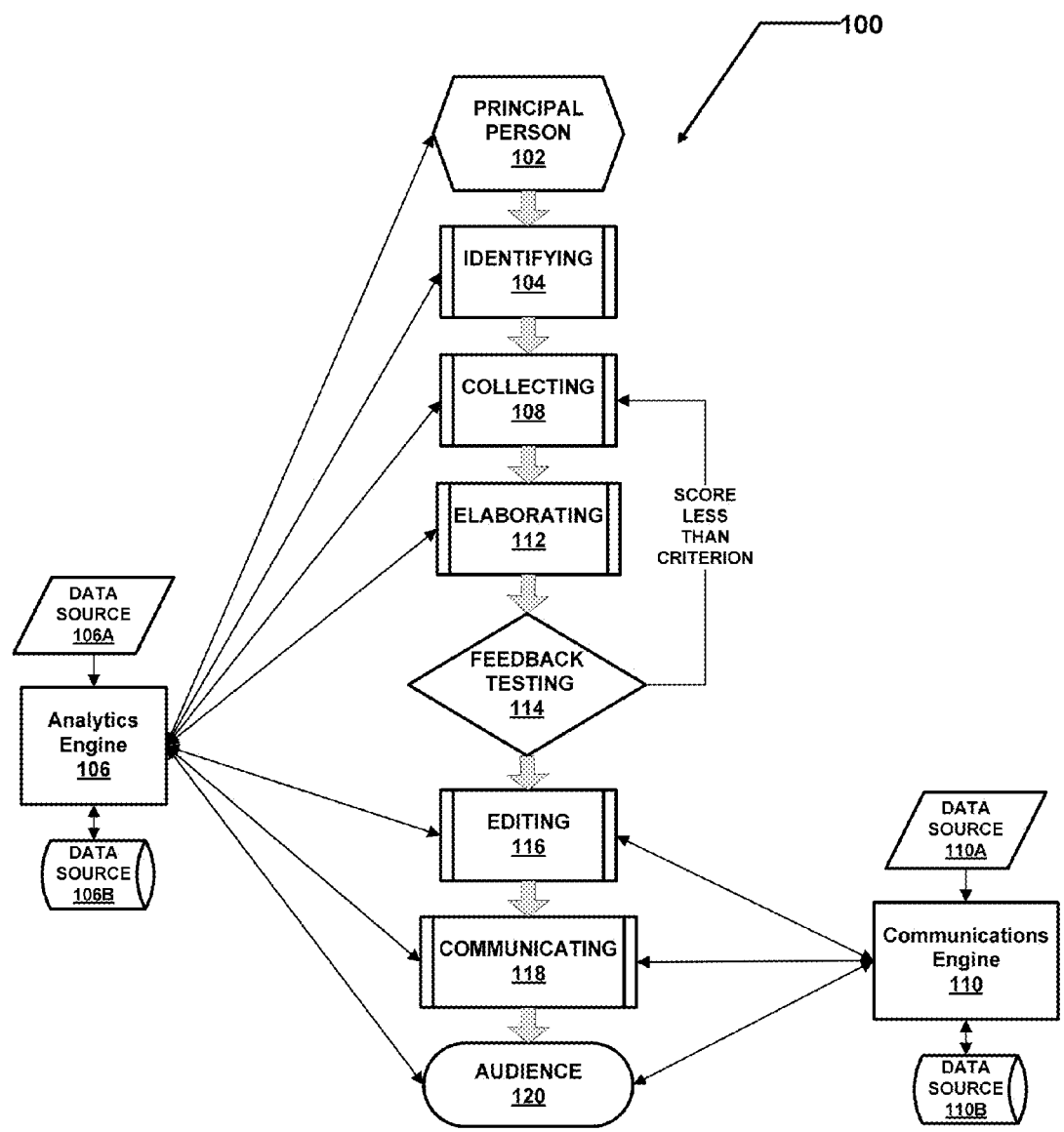
FIG. 1 is a flowchart.

Various techniques will now be described in detail with reference to a few example embodiments thereof as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details. In other instances, well known process steps and/or structures have not been described in detail in order not to obscure some of the aspects and/or features described or referenced herein.

One or more different inventions may be described in the instant patent application. Further, for one or more of the invention(s) described herein, numerous embodiments may be described in the instant patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that the other embodiments may be utilized and that structural, logical, software, electrical and other changes may be made without departing from the scope of the one or more invention(s). Accordingly, those skilled in the art will recognize that the one or more of the invention(s) may be practiced in various modifications and alterations. Particular features in the one or more invention(s) may be described with reference to one or more particular embodiments of figures that form a part of the present disclosure, and in which are shown, by way of illustration, specific embodiments of the one or more invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of the invention.

Further, although process steps, method steps, algorithms or the like may be described in a sequential order, such processes, methods and algorithms may be configured to work in alternate orders. In other words, any sequence or order of steps that may be described in the instant patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

When a single device or article is described, more than one device/article (whether or not they cooperate) may be used in place of a single device/article. Similarly, where more than one device or article is described (whether or not they cooperate), a single device/article may be used in place of the more than one device or article.

Techniques and mechanisms described or referenced herein will sometimes be described in singular form for clarity. However, particular embodiments include multiple iterations of a technique or multiple instantiations of a mechanism unless noted otherwise.

The system described here enables a person to imbue a surrogate to sing a song or play a tune on a musical instrument on behalf of the person. The surrogate can be matched with the person in digital appearance, voice, or manner, or a combination of any two or more of them. The surrogate can use the person's personal knowledge, expertise, or musical skill, or a combination of any two or more of them, in order to sing the song or play a tune on a musical instrument on behalf of the person. For instance, if the person is an expert Blues singer but only a beginning opera singer, the surrogate can sing Blues on behalf of the person at an expert level and can sing opera on behalf of the person at a beginner level. Similarly, if the person is a novice player of a harmonica but an expert guitarist, the surrogate can produce harmonica music on behalf of the person at a novice level but guitar tunes at an expert level.

The surrogate can sing a song with other singers or play an instrument with other musicians, such as real people or surrogates of other people. The other singers or other musicians with whom the surrogate sings or plays are sometimes referred to here as partners of the surrogate. The surrogate can determine a start or conclusion of the song based on a move or action by one or more of the surrogate's partners. For instance, when a person's surrogate is singing a jazz song or playing jazz with a trombone, the surrogate can determine its next move based on the last move of its partner and based on the skill level of the person. A person's surrogate can employ a karaoke style at the skill level of the person to sing or play a song that is not in the repertoire of the surrogate, for instance by following the lyrics of the song in time with the music or playing an instrument according to a score of the song.

The surrogate can interact with its partners during. For instance, a surrogate of a person can be manifested as a personalized digital avatar that can respond to natural language questions or comments from other singers or musicians. The avatar of the surrogate can respond based on information about the person, such as the person's opinions on certain issues, the person's preferences for certain styles of song or music, the person's memories, jokes the person told, or other information.

In an example, an elderly person (e.g., a grandfather) can imbue a surrogate with his song singing abilities or prowess on the guitar, video recordings of his gestures and behaviors during song singing, memories of past music events, or other information. In the future, e.g., after the grandfather has passed away, the grandfather's family can sing a song with the grandfather's surrogate, listen to the grandfather's guitar playing, or learn how to sing or play the grandfather's favorite songs. The system used by the surrogate can present the lyrics and music, for instance in a karaoke style or air guitar style. The grandfather's surrogate sings the song at the level at which the grandfather used to sing the song and plays the tune of the song at the level at which the grandfather used to play the song. The grandfather's surrogate and can exhibit behaviors and gestures similar to behaviors and gestures that the grandfather used to exhibit while singing or playing the song. The grandfather's surrogate can engage in a conversation with the grandfather's family during a music event, e.g., sharing the grandfather's memories of singing or playing the song, telling jokes that the grandfather used to tell, responding to questions about the grandfather's life story, or engaging with the grandfather's family in another way.

The system described here enables members of a community of users on a network, such as a social network, each to imbue a surrogate, which is matched in digital appearance, voice, or manner, or a combination of any two or more of them, with the user's personal knowledge, expertise, or discernment, or a combination of any two or more of them, in order to carry out the user's directives and intent at some predetermined future time. In an example, a senior user of a social media network may embed his life story in digital format together with a personalized digital avatar. An intelligent surrogate can subsequently present that life story or portions thereof in response to natural language questions or can act on the senior's behalf to carry out the senior's directives, e.g., in the future after the senior dies or becomes incompetent. In an example, a senior user of a social media network may embed his singing or musical instrument playing prowess in digital format. e.g., in response to natural language questions or by visual song configurations. An intelligent surrogate can subsequently act on the senior's behalf to carry out the senior's directives, e.g., by singing or playing an instrument at the senior's level of skill with known or similar songs and tunes, e.g., in the future after the senior dies or becomes incompetent. The system can use the licensed original music while displaying the lyrics of the song. In some examples, recorded words of encouragement, e.g., words licensed from the original artist of the song, words from the person or another user, or other words, can be emitted. In some examples, a full or partial vocalization or instrumental rendering by the original artist of a song, licensed on a per use basis or in another arrangement, can be played in the background. In some examples, an interactive tutoring lesson can be provided, e.g., a singing or instrumental lesson, given by the person or another user or by the original artist of the song, e.g., licensed on a per use basis or in another arrangement FIG. 1 shows the conceptual framework 100 of the interaction of a system with a principal person 102 for extracting and transforming a life history of the principal person 102. In some cases, the system can extract and transform musical approaches of the principal person 102, such as song singing or instrument playing strategies or abilities or both, for one or more specific songs or more generally. The principal person 102 logs onto the system and answers some standard identification questions, 104. Based on the identification questions 104, an analytics engine 106 in the system can search for relevant internet accessible information about the principal person 102, events that occurred during his lifetime, music popular during his lifetime, or other information. For instance, the analytics engine 106 can search for the words and tunes of popular songs. The analytics engine 106 can search in external data sources 106A, such as internet accessible data sources, or internal data sources 106B, such as in system databases that store data previously accumulated by the analytics engine. The system then progresses to collecting answers, 108, to autobiographical questions, which cover aspects usually published in a biographical note or obituary article. To assist the principal person 102 in answering the questions and to be consistent with the historical record, the system aided by the analytics engine 106 can assemble material from internal data sources 106B or internet accessible data sources 106A about the principal person 102 or the events that occurred during his lifetime. This material can be presented to the principal person 102 along with the autobiographical questions. Data about the principal person 102, such as images of the principal person 102, verbal answers from the principal person 102, video or audio recordings of the principal person 102 singing to or playing tunes, such as popular music, classic folk music, or other types of music, are collected 108 digitally by the system.

The system can ask personal, individual questions during a session of elaboration 112 presented by an interrogation avatar with whom the principal person 102 is relaxed and comfortable. The interrogation avatar, which is generated by the analytics engine 106 using techniques similar to those for LivingActor™ and can be selected by gender, age, ethnicity, voice type and other variables, is programmed with natural language understanding similar to that of Siri® (Apple®) or Nina™ (Nuance Communications), and exhibit a number of behavioral expressions as do those avatars of LivingActor™ in response to the answers of the principal person 102. This elaboration 112 of autobiographical information can use a third set of open-ended questions presented by the interrogation avatar to elicit life stories, such as those recorded by StoryCorps®, to cover more personal topics, such as "What is your earliest memory?", "Who was your favorite teacher?" "What is your favorite flavor of ice cream?", "What is your favorite song?", "What type of music do you like?", "What was it like growing up in the [neighborhood, city, region, wartime, depression]?", or other questions. The elaboration 112 using the analytics engine 106 can interactively expand upon the questions along the lines of Weizenbaum's ELIZA program but in a more sophisticated manner guiding the principal person 102 through a series of life experiences, which may include the singing of or playing the tunes of favorite songs, in some cases with licensed music and lyrics supplied by the system. The responses of the principal person 102 are recorded digitally both in terms of voice, and three-dimensional appearance with behavioral gestures, such as finger placement for guitar chords.

In some examples, the analytics engine 106 can extract and transform musical styles of the principal person 102, such as vocal or instrument strategies or abilities or both, for one or more specific songs or more generally. For instance, the analytics engine 106 can extract song and instrument approaches for songs, such as 'Star Spangled Banner', 'America the Beautiful', 'Sweet Caroline', or folk songs such as 'My Land.", 'Troubled Waters', or songs from American Idol or movies or musicals "Oklahoma", "South Pacific", "Chicago", or "Book of Mormon", or songs or musical pieces from other sources. In some examples, the songs are sung by a duet, a quartet or a whole chorus. In some examples, the tunes are played by a duet, a quartet or a whole band or orchestra. The system, aided by the analytics engine 106, collects data indicative of the principal person's approach to singing songs and/or playing tunes. For instance, the analytics engine 106 can guide the principal person 102 through a series of songs to collect data indicative of how the singing range of the principal person 102 can be classified, e.g., as soprano, mezzo-soprano, alto, tenor, baritone, bass; how the instrument playing style of the principal person 102 can be classified, e.g., as classical, baroque, modern, or post-modern; what strategies the principal person 102 tends to employ in learning to sing or play a song; with what skill level the principal person 102 performs the song (e.g., beginning, intermediate, or expert), or other data. The analytics engine 106 can collect and assess the behavior of the principal person 102 during the song, such as verbal embellishments, gestures, instrument flourishes or other behavioral responses. In some cases, the analytics engine 106 can collect still or video images or audio recordings of the principal person 102 singing or playing a song (sometimes together called rendering or performing the song). In some cases, the analytics engine 106 can prompt the principal person 102 to provide stories about a song, such as memories the principal person 102 has about rendering a song in the past, reasons why the principal person 102 likes a song, reasons why the principal person 102 renders a song in a certain way, or other stories. In some cases, the analytics engine 106 can prompt the principal person 102 to identify his or her favorite songs, artists, or musical styles, such as songs by Stevie Wonder, the Supremes, or Taylor Swift.

The system aided by the analytics engine 106 then creates a proxy surrogate of the principal person 102. The proxy surrogate includes an avatar of the principal person 102 linked with the personal knowledge of the principal person 102 and the ontology of his world at that point in time. The avatar of the principal person 102 is generated using a digitized three-dimensional video image of the principal person 102 parsed into behavioral expressions employed to morph the avatar's image, for example, facial expressions of the principal person 102 using software such as that of FaceShift.com. The principal person's voice can be employed to generate the avatar's voice matched in pitch or other sound attributes using articulatory synthesis together with a database of speech units, which may amount to a billion or more for responding to arbitrary questions. In some cases, life stories or jokes may be recorded and used partially or in their entirety.

In some examples, the proxy surrogate of the principal person 102 can include the avatar of the principal person 102 linked with the song rendering approaches of the principal person 102. The proxy surrogate of the principal person 102 is able to sing a song at the skill level of singing (e.g., beginner, intermediate, expert) of the principal person 102. The avatar can exhibit verbal responses that can be assessed along with accompanying verbal responses, gestures, or other behavioral responses of the principal person 102 during the song. In general, the proxy surrogate of the principal person 102 is able to reproduce the song rendering of the principal person based on the analysis, by the analytics engine 106, of the approach of the principal person 102 to the song, without having to anticipate or calculate the combinatorial number of steps or outcomes in the song.

The accuracy of the proxy surrogate transformation is assessed 114 by the principal person 102 or another person. For instance, to assess accuracy, the principal person 102 or a second person interrogates the system's proxy surrogate of the principal person 102. e.g., using a script of frequently asked conventional questions or by presenting common song configurations for one or more songs. If there are gaps or errors in the response of the proxy surrogate, the process iterates until the performance of the proxy surrogate of the principal person 102 reaches a predetermined or desired level of correctness in terms of this limited Turing Test.

As a result of the training and testing, proxy surrogate of the principal person 102 is enabled to answer general and specific questions and to execute a repertoire of single or multi-person songs by means of an avatar matching in appearance, voice, manner or gesture the principal person 102 and by means of the analytics engine 106 equipped with a digital representation of the transformed personal knowledge in the form of an ontology covering the lifetime of the principal person 102 using the techniques described by Gruber et al. (U.S. patent application Ser. No. 12/987,982, filed Jan. 10, 2011, the contents of which are incorporated herein by reference) to include an automated assistant receiving user input; an active ontology with representations of concepts and relations among concepts drawn from various databases of historical data and a language interpreter parsing the questioner's input to derive a representation of questioner's intent in terms of the active ontology. When the proxy surrogate of the principal person 102 is able to sing songs according to the principal person's approach to those songs, the ontology may include single or multi-person songs, such as those of the Jackson 5, the Temptations, the Trapp Family, or other multi-person songs.

Using a communications engine 110 and the analytics engine 106, the transformed digital representation of the principal person 102 is edited 116 for particular formats and audiences then communicated 118 when appropriate to that audience 120. So the proxy surrogate of the principal person 102 can be used to generate an interactive obituary, a digitized life history in the Story Corps® sense or as a published autobiography using the book assembly techniques of Parker (Philip M. Parker. U.S. Pat. No. 7,266,767 B2, granted Sep. 4, 2007 entitled "Method and Apparatus for Automated Authoring and Marketing", which is incorporated by reference) or serve in place of the principal person 102 at a memorial service or at subsequent anniversaries or on special occasions.

It will be apparent, however, to one skilled in the art, that the framework described may be practiced using not only voice communication or text communication and but more broadly for expertise in various domains. For example, a business may wish to deploy the expertise of one of its employees to several remote locations simultaneously and interactively or in the form of a written or electronic manual or multimedia-based expert system.

Figure 2:
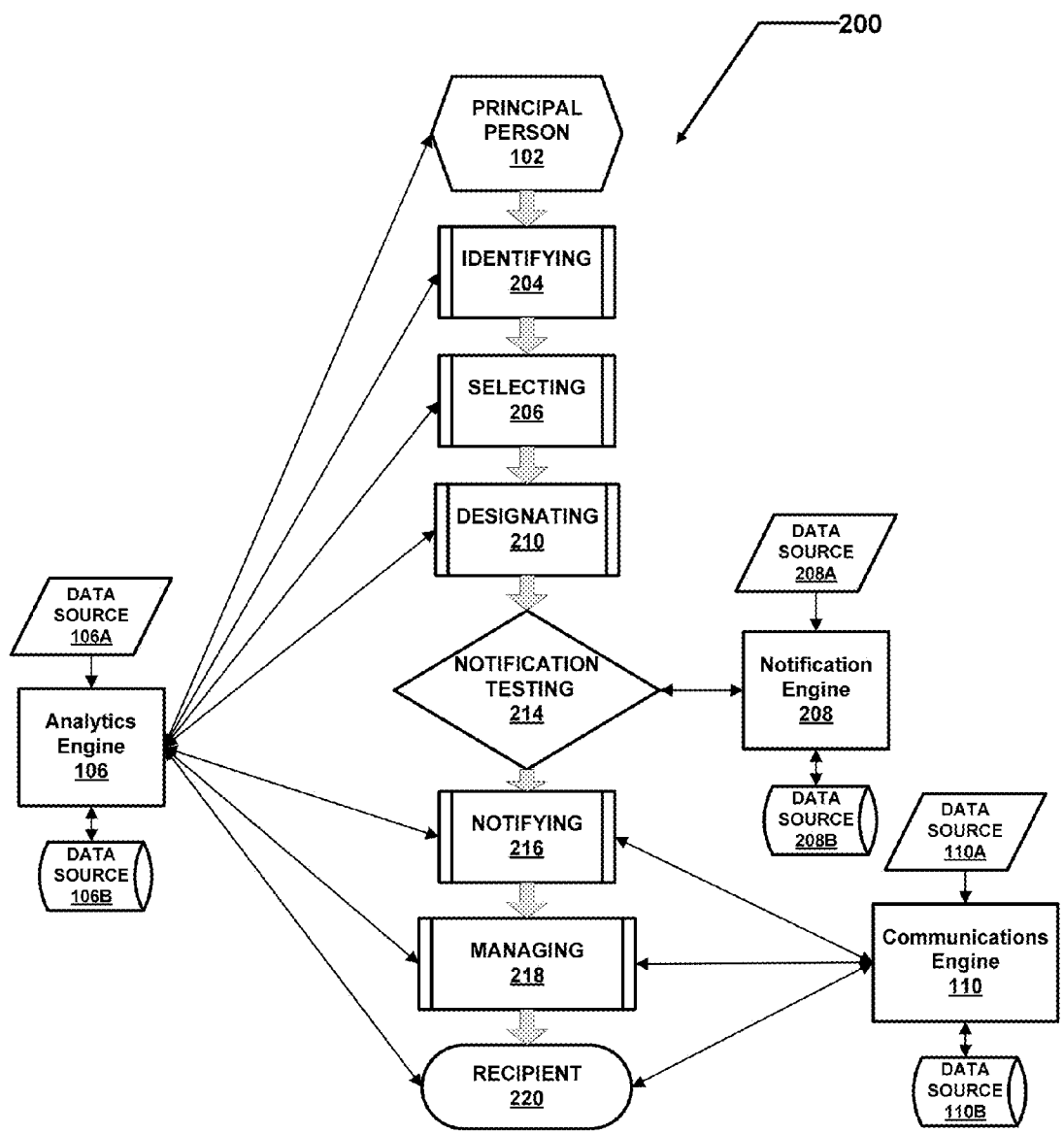
FIG. 2 is a flowchart.

FIG. 2 shows a conceptual framework 200 for the entering and execution of advance directives for future actions. The principal person 102 logs in to his account for identification 204, to access identification information and some or all of the information known or inferred by the analytics engine 106 that has been collected, organized and transformed into an intelligent personal assistant that can act as a proxy surrogate, e.g., for use when the principal person 102 becomes incompetent. The advance directives enable the system acting as the proxy surrogate of the principal person 102 to compose and deliver messages, to purchase gifts and arrange for their delivery to living persons specifically identifiable at the time the directives were entered or to persons unborn or not yet part of the social network at the time the directives were entered; to convene and organize social gatherings to similarly chosen guests; to engage in one or more social songs involving two or more singers; or to carry out other activities; or a combination of any two or more of them. The principal person 102 initiates directives with a process of selection 206 of the occasion or event, which can be specified by the principal person 102 or chosen from a set provided by the analytics engine 106. The principal person 102 specifies a designation 210 of a person or persons to be contacted, sometimes referred to as recipients. Using the notification engine 208 specifies a future date of notification 214 or a way by which a future date of notification can be determined. When the system detects the said date has occurred the communication engine 110 aided by analytics engine 106 initiates a notification 216 of the recipients and manages carrying out the directives 218. For example the system with the aid of the analytics engine 106 which can access an ontology of future time, can determine the birthday of a recipient, analyze with the aid of the communication engine 110 the preferences of a recipient, e.g., from the recipient' social network profiles or other internet accessible information, then contact a vendor for a suitable gift and arrange for its delivery. In some embodiments, the analytics engine 106 acts as a proxy surrogate of a principal person 102 to generate responses (e. g., messages, and/or delivery instructions) based on historical data specific to the recipient 220. For instance, the analytics engine 106 may be configured as described by Gruber et al. (U.S. patent application Ser. No. 12/987,982, filed Jan. 10, 2011, the contents of which are incorporated herein by reference) and by Cheyer et al (U.S. Pat. No. 8,892,446 entitled "Service Orchestration for Intelligent Automated Assistant", granted Nov. 18, 2014, the contents of which are incorporated herein by reference) to include an automated assistant receiving user input; an active ontology with representations of concepts and relations among concepts drawn from various databases of historical; and a language interpreter parsing the publisher user input to derive a representation of principal person's intent in terms of the active ontology together with a services orchestration to output responses and instructions to implement the principal person's intent.

It will be apparent, however, to one skilled in the art, that the framework described may be practiced for more than communicating multimedia messages at future times, delivering gifts to relatives or friends on future occasions, or organizing future meetings and presentations, or interacting in multi-person songs. For example, a business in the event of an emergency may wish to deploy the expertise of one of its employees to several remote locations simultaneously and interactively or in the form of a robotic interactive manual or multimedia-based expert system.

Figure 3:
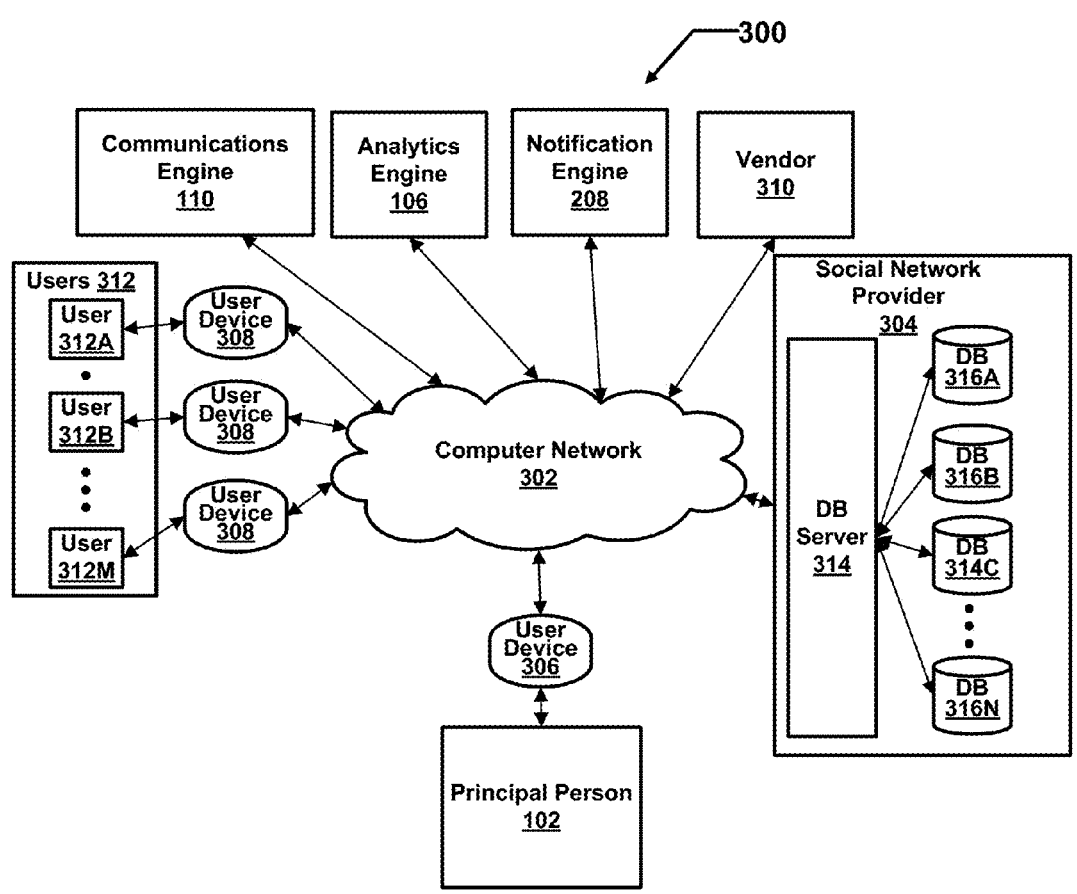
FIG. 3 is a block diagram of a system.

FIG. 3 is an example configuration of a system 300. The principal person 102 by means of his computing device 306, which is connected to the Internet 302, is enabled to generate a representational proxy surrogate of the principal person 102 imbued with his personal knowledge and capable of discerning his intent for executing directives for future actions. The analytics engine 106, the communication engine 110, and the notification engine 208 are also connected to the Internet and are able to access the services of a vendor 310 via the internet. These engines and services draw upon internet-accessible databases on the network 304, which store the data and relationship supporting the lifetime ontology of the principal person 102 as well as the present and future ontologies in which the directives of the principal person 102 will be carried out. The communications, interactive presentations and directives of the principal person 102 are targeted at internet-enabled recipients 312.

Figure 4:
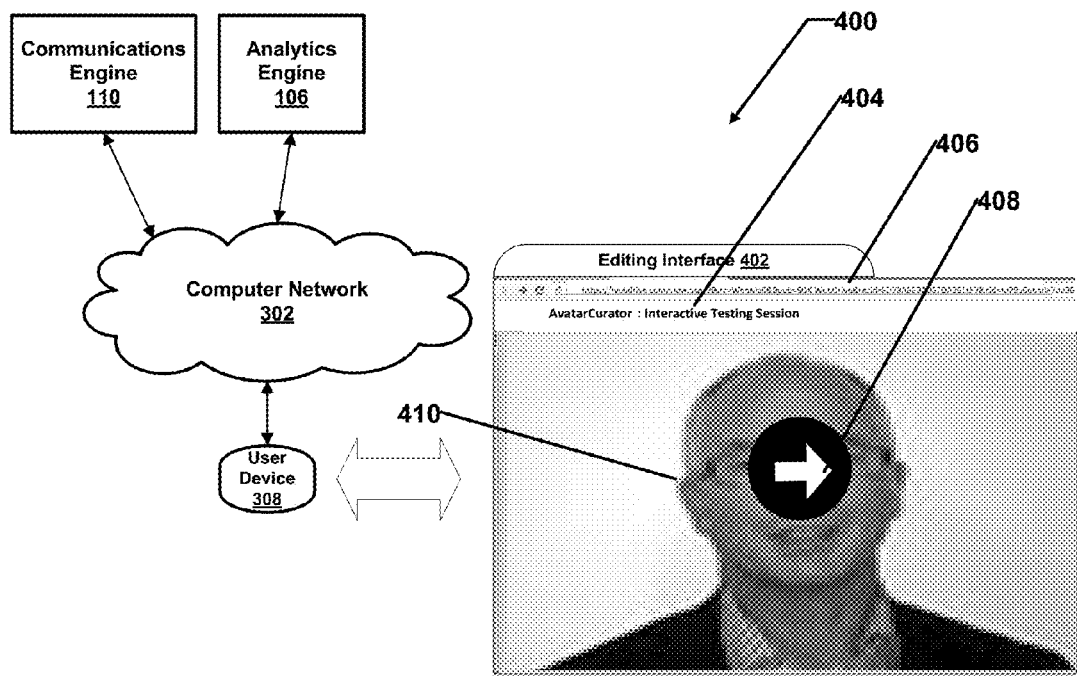
FIG. 4 is a view of an editing interface.

FIG. 4 shows an example embodiment of an editing interface 400 presented to the principal person 102. The internet-accessible computing device 402 is a means of presenting an avatar 410, which can be an interrogating avatar for interactively collecting life history information from the principal person 102 or for engaging in rendering songs with the principal person 102 or the avatar of the principal person 910 to determine by testing if the system proxy surrogate has met a predetermined criterion of correctness. The window title 404 indicates the stage of surrogate development. The website URL is noted by 406. The video start button 408 can be clicked or commanded verbally to start the session. When the system proxy surrogate has met the predetermined criterion of correctness the principal person 102 can proceed to set up directives for future actions.

Figure 5:
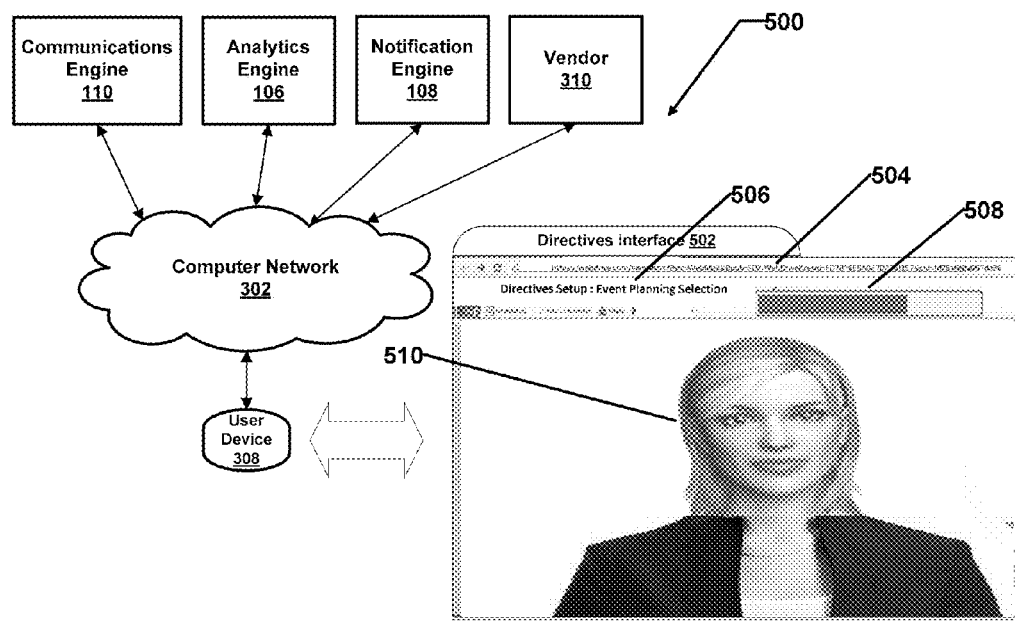
FIG. 5 is a view of an editing interface.
Figure 6:
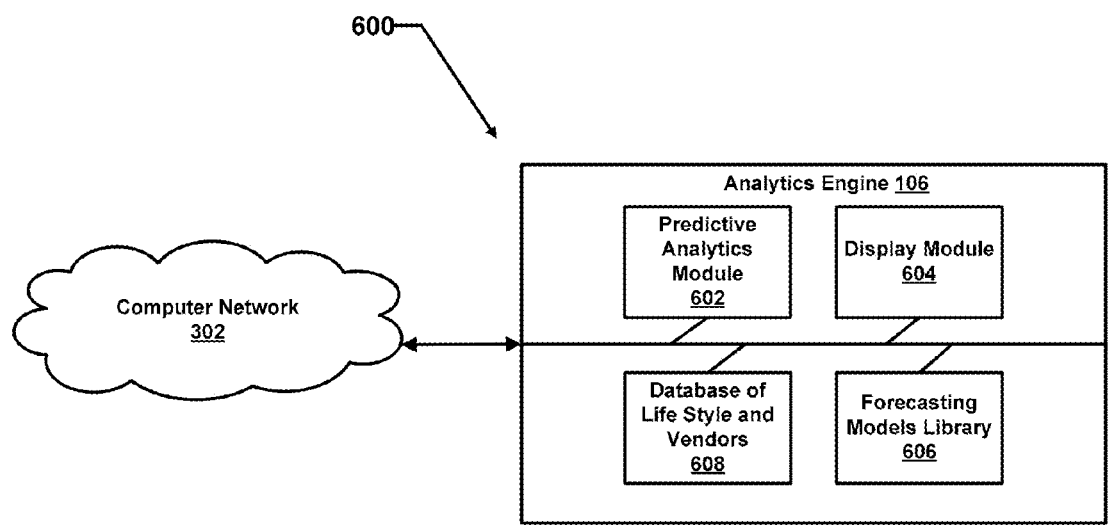
FIGS. 6-8 are block diagrams.

FIG. 5 is a view of an editing interface 500 for entering surrogate directives. The internet-accessible computing device 502 is a means of presenting an avatar 510, which can be a planning avatar to receive instructions by natural language dialog for executing future actions. The window title 506 indicates the type of directive being edited. The website URL is indicated by 504. A progress bar 508 indicates the steps completed and those steps still to be completed FIG. 6 is a block diagram of the analytics engine 106 of the system 300. The analytics engine 106 facilitates identifying notification trigger events for the principal person 102 or recipients, curating an appropriate message upon notification, then publishing or delivering communications to one or more recipients in response to a significant event on behalf of principal person 102. For instance, the analytics engine 106 can infer information about the principal person 102, the recipient, or another person who is described in the communication, or a combination of any two or more of them, from one or more data sources. The analytics engine 106 can determine or infer milestone events for the principal person 102, the recipient 312, or another person who is described in the communication, or a combination of any two or more of them. The person described in the communication may be the recipient (sometimes also referred to as the intended reader of the communication), a publisher or editor of the communication, both the reader and the publisher or editor, or neither the reader nor the publisher or editor.

A predictive analytics module 602 in analytics engine 106 applies search algorithms and forecasting models stored in a search and forecasting models library 606. The predictive analytics module 602 can analyze present and/or historical data, such as data about the principal person 102, the recipient 312, or both, in view of data stored in a database 608, to identify milestone events or to suggest appropriate media messages or items for a reader user. The predictive analytics module 602 can implement a variety of forecasting techniques beyond simple algorithms, such as future date calculation, including statistical techniques such as machine learning (e.g., as applied by IBM's Watson computer), song composition and music theory, and data mining, to analyze current and historical data to determine significant event triggers for notification, to make predictions about future readers, to identify communication media messages, and to identify appropriate delivery times and methods, among a wide variety of other analyses and algorithms. For example in the case of an autobiographical communication item of a grandfather (the principal person, also sometimes referred to as a publisher user), the reader user is the projected offspring of a current member in the system but the publisher user may incapacitated at the time of publication and delivery or both. By a computer-implemented method, data relevant to the publisher user may be extracted from his profile in the system 300 and/or generated implicitly based, at least in part, on the publisher user's stored profile together with historical data by a predictive analytics algorithm based on historical data. Based on the extracted or generated data, a significant event is identified, content for a communication is selected, appropriate reader users are identified, and/or other analysis is performed, in some cases without input from the publisher user.

In some examples, the analytics engine 106 may use data specific to a user to identify potential milestone events (e.g., to identify a bar mitzvah date for a child based on the child's birth date or to identify appropriate religious holidays based on the user's specified religious affiliation or a prevailing religion in the region where the user lives). In some cases, the predictive analytics module 602 may also incorporate present or historical data or both to identify relevant information for the communication subject or reader user or both that are in keeping with preferences of the publisher user. In other examples, the analytics engine 106 analyzes publically available sources of information and/or private sources of information to which it has access, including. e.g., social networking facilities, online or mobile periodicals such as newspapers or magazines, and websites, to identify the occurrence of significant events associated with the reader user or with the person whom the communication is about. For instance, the analytics engine 106 may analyze trade journal websites to set up criteria so the notification engine 208 can identify when a target person receives an award or a promotion.

A display module 604 of the analytics engine 106 may display the significant events of an individual of interest (e.g., a reader user or another individual specified by the publisher user) on a webpage belonging to or accessible by the publisher user. These events with associated actions can be selected for notifications stored in the notification engine 208. In some embodiments, upon notification by the notification engine 208, the analytics engine 106 may automatically communicate messages of a significant event relevant to a reader user, such as a birthday, to the communication engine 110, which sends the notices to relatives of the reader user, who can act as publisher users. The analytics engine 106 may use information about a reader user found in various databases to determine when to send out the notices.

In some embodiments, the predictive analytics implemented by the analytics engine 106 incorporate the robust, optimizing forecasting techniques of Pinto et al. (U.S. Pat. No. 7,499,897, issued on Mar. 3, 2009; U.S. Pat. No. 7,562,058, issued on Jul. 14, 2009; U.S. Pat. No. 7,725,300, issued on May 25, 2010; U.S. Pat. No. 7,730,003, issued on Jun. 1, 2010; U.S. Pat. No. 7,933,762, issued on Apr. 26, 2011; U.S. Pat. No. 8,165,853, issued Apr. 24, 2012; U.S. Pat. No. 8,170,841, issued May 1, 2012; U.S. Pat. No. 8,751,273, issued on Jun. 10, 2014; and U.S. patent application Ser. No. 10/826,949, filed Apr. 16, 2004, the contents of all of which are incorporated herein by reference in their entirety), that manage historical data using missing values, which must be inferred.

The analytics engine 106 can act as a proxy surrogate for the principal person 102 by specifying communications, goods, and services or any other communication items for placement into storage. In some examples, such as if the potential recipient 312 is registered in the system 300, the communication engine 110 will determine the location of the recipient, e.g., by GPS tracking or similar means. The reader user's interests and status may be available in the reader user's profile, which, taken together with historical data, enable the analytics engine 106 utilizing inferences from missing data, if necessary, to determine an appropriate gift to accompany the message and an optimal time for delivery. The delivery time is selected by a predictive analytics algorithm, based on historical data specific to the reader user.

In some embodiments, the analytics engine 106 acts as a proxy surrogate of a principal person 102 to generate communication items (e.g., messages, sympathy tribute selections, and/or delivery instructions) or to engage in interactive rendering based on data, e.g., historical data, specific to the recipient. The interactive songs may involve two or more people connected to a computer system in for instance, a hymn or rhythm and blues song. The singers can be present in a single room or can be remotely located, e.g., as in a multi-singer online choir such as that for Handel's Messiah, which can involve over 100 singers around the world. For instance, the analytics engine 106 may be configured as described by Gruber et al. (U.S. patent application Ser. No. 12/987,982, filed Jan. 10, 2011, the contents of which are incorporated herein by reference) to include an automated assistant receiving user input; an active ontology with representations of concepts and relations among concepts drawn from various databases of historical data (for instance, for the case in which the publisher user is the agent of a corporation, the corporate personnel database may be referenced); and a language interpreter parsing the publisher user input to derive a representation of publisher user intent in terms of the active ontology together with a services orchestration to output responses and instructions to implement the publisher user's intent. The automated assistant acting as the agent of a person, group of people, agency, government, corporation, or other entity may engage in role rendering for instruction, promotion, emotional support or marketing. By a computer-implemented method, data relevant to the reader user may be extracted from his profile, generated implicitly based, at least in part, on the reader user's stored profile with the system together with historical data by a predictive analytics algorithm based on historical data, and/or obtained from publically available or privately accessible information sources. Based on the extracted or generated data a communication is selected, generated, and delivered, in some cases without input from the publisher user.

Figure 7:
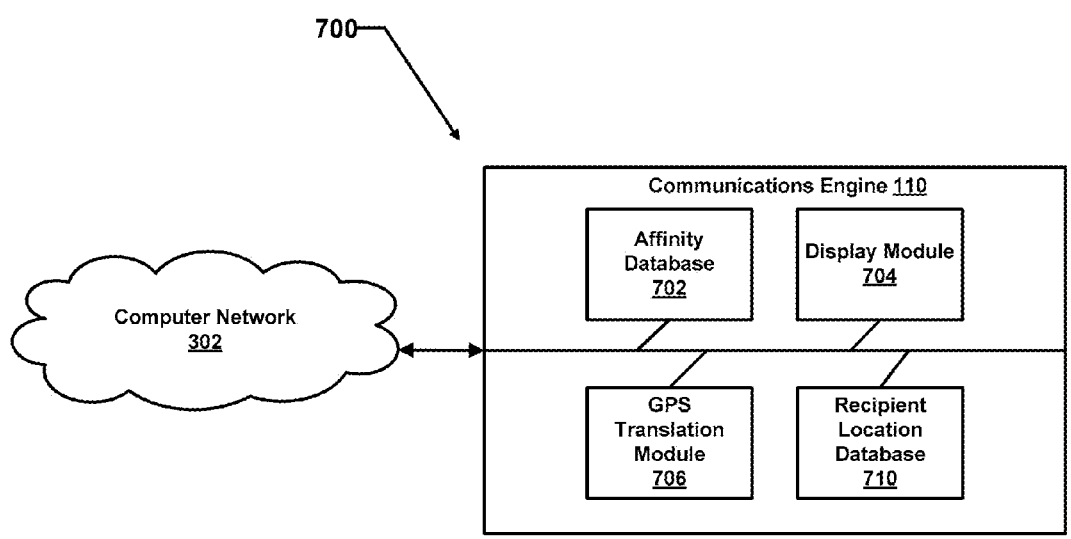

FIG. 7 is a block diagram 700 of the communication engine 110 of the system 300. The communication engine 110 facilitates identification of a significant event person along with criteria used by the notification engine 208 to trigger notification of the curator for composing a message, publishing or delivery of communication items, which may be an invitation to sing a song for a principal person 102 by providing information about a reader user's physical location, profile interest information, and/or affinity information. In some examples, the location, interest, and affinity and other current and historical information may be displayed by a display module 704 on a webpage belonging to or accessible by the publisher user. The communication engine 110 includes an affinity database 702 for storing significant event person and reader user affinity information and a reader location database 710 for storing the physical location of a reader user. The reader location database 710 may receive data relevant to the location of a reader user from a GPS translation module 706 or may obtain the reader user's location from the analytics engine's 106 analyses of websites or other sources of information. For example, the publisher user may have composed a sympathy note regarding an individual killed in an accident; the communication engine 110 determines that the next of kin is traveling in another country and thus likely to be reachable by email but not by phone.

Figure 8:
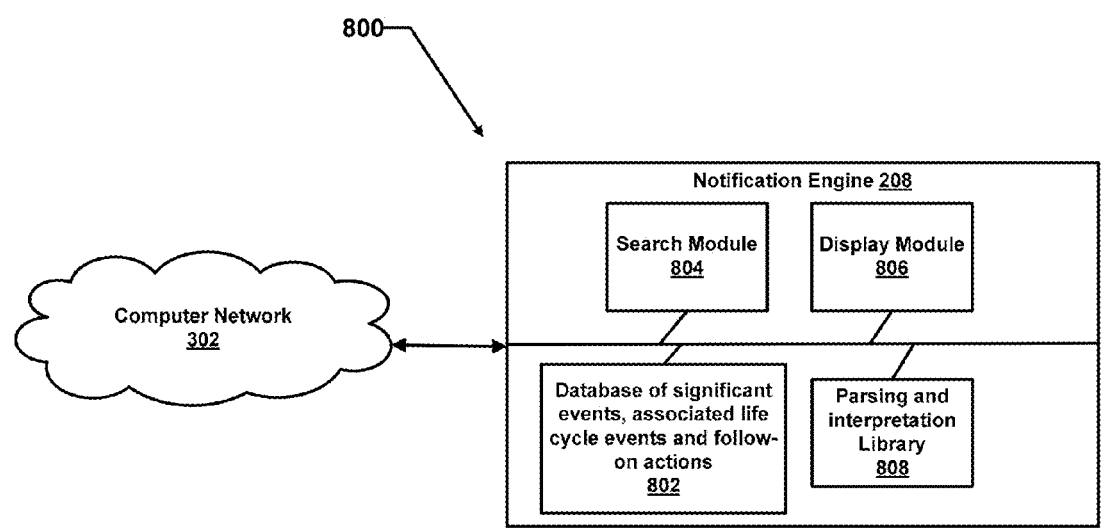

FIG. 8 is a block diagram 800 of the notification engine 208 of the system 300. The notification engine 208 facilitates publishing or delivery of communications for a principal person 102 by detecting significant events of interest to the principal person 102 such as an upcoming song or performance as listed in a data file 802. For example, a publisher user may be notified about the death of a friend by means of a search module 804 supported by a parsing and interpretation library 808. The publisher user may then compose and publisher or deliver a sympathy message to the friend's family. In some examples, information of the individual whose significant event has been detected (referred to here as the tracked individual) may be displayed by a display module 806 on a webpage belonging to the publisher user. The notification engine 208 may also display the tracked individual's profile within the system 300 for confirmation of the individual's significant event.

Figure 9:
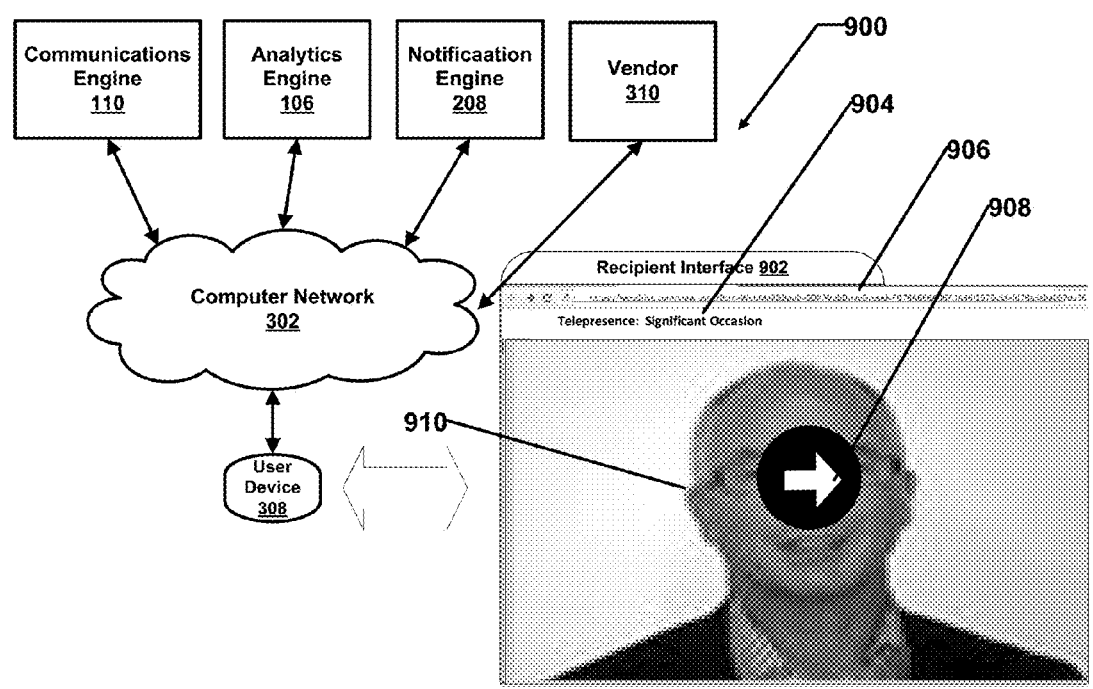
FIG. 9 is a view of a recipient interface.

FIG. 9 is a view 900 of a recipient interface. The internet-connected computing device 902 enables a multimedia display that shows an avatar of the principal person 910 programmed to deliver answers to natural language inquiries using the detailed knowledge of the principal person 102 previously collected, curated and transformed or to sing a popular song, hymn, opera aria or country song at the level of skill of the principal person 102, in some cases with behavioral gestures or natural language comments or both acquired from the principal person 102.

Figure 10:
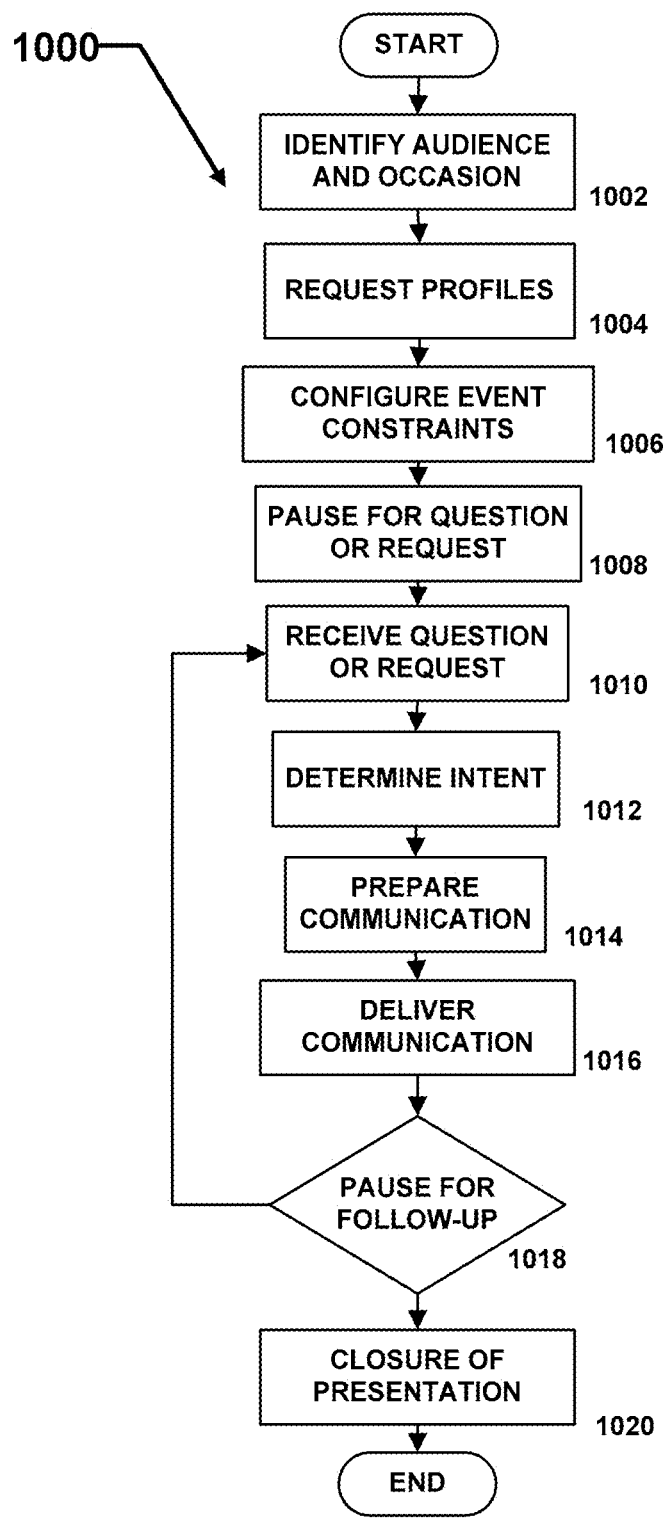
FIGS. 10-15 are flow charts.
Figure 11:
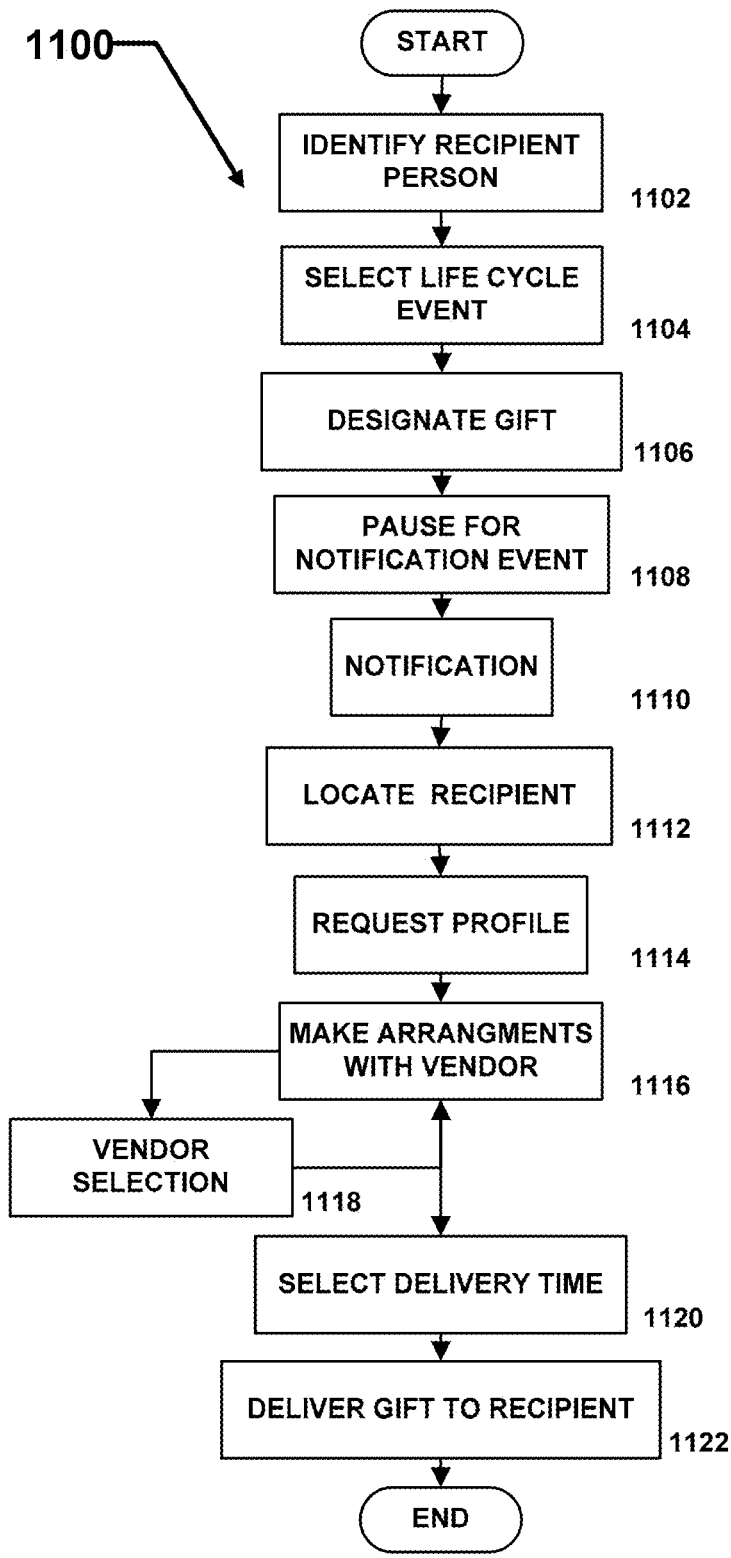

FIG. 10 is a flowchart of an example process 1000 for communicating a multimedia message in the system 300. In the process a principal person has directed his proxy surrogate with an occasion and a specific audience (1002). The proxy surrogate using the communication engine requests the profiles of the audience members (1004). The analytics engine then provides event constraints for the communication (1006). Using the notification engine there is a pause for the first question of request (1008). When the question or request is received the intent is determined by the analytics engine (1012) and the response is prepared (1014). The communication engine using the proxy surrogate avatar delivers the communication (1016). Then there is a pause for follow-up (1018) and the cycle repeats until the notification engine determines the presentation is complete. Then there is a closure of the presentation (1020). The audience may be given the opportunity to acknowledge receipt and confirm delivery and even reply to the principal person or to his proxy surrogate:

FIG. 11 is a flowchart of an example process 1100 for distributing a song prize, or tribute in the system 300. In the process 1100, a principal person has selected or set up a directive to select a recipient person (1102) and a particular musical event (1104) and using the communication engine for obtaining a profile of the person and the analytics engine for predictive forecasting tribute, such as a musical tribute, e.g., a birthday song sung by the principal person or the proxy surrogate of the principal person, or a gift, which is then chosen (1106). Then there is a pause (1108) but on the appropriate date as determined by the notification engine (1110) the recipient is located by means of the communication engine (1112) using the current recipient profile for obtaining the location (1114). Under the directives the system makes arrangement with a vendor (1116) using the analytics engine for vendor selection (1118) and delivery time selection (1120). The gift vendor or another vendor then delivers the gift to the recipient (1122). The recipient may be given the opportunity to acknowledge receipt and confirm delivery and to reply to the principal person or the publisher user's proxy surrogate.

Figure 12:
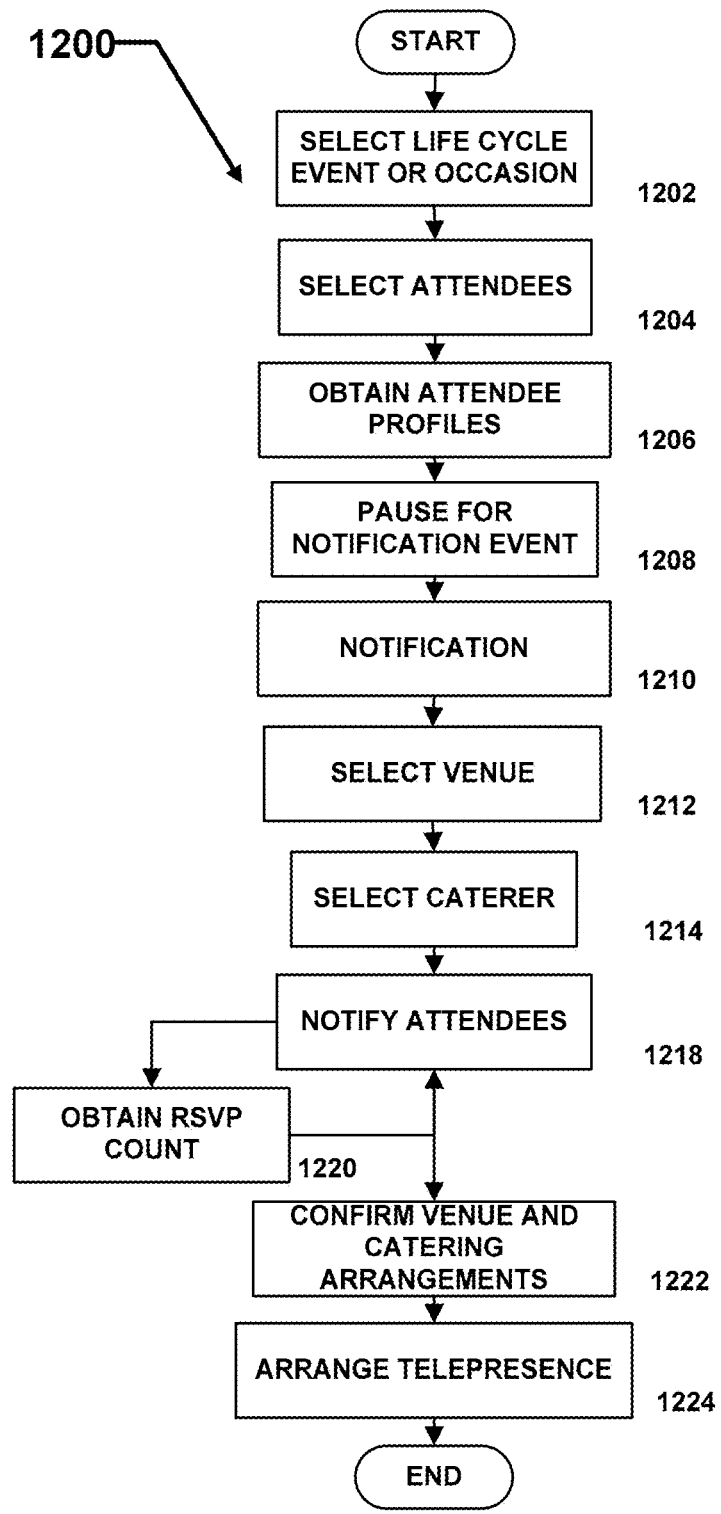

FIG. 12 shows a flowchart 1200 of the management of an advance event directive planned by the principal person. The principal person selects the type of event to host (1202), such as a social gathering or song tournament, and selects the attendees either directly (1204) or by description using profiles, if available (1206). The principal person then sets the date of the event or some triggering criterion, e.g., birthday party or graduation party (1208) and the venue directly or by description, e.g., function room at Waldorf Astoria in New York (1212). Based on the guests' profiles, the proxy surrogate selects the menu and caterer which may be the regular venue caterer (1214). In advance of the appropriate date or immediately after notice of the triggering event, the proxy surrogate of the principal person sends out the invitations (1216) using a service such as EventBrite™ to collect RSVPs (1220) then confirms the appropriate venue and catering arrangements (1222). Then the proxy surrogate arranges for an internet-accessible telepresence display (1224). The telepresence display may be configured as an interactive video display, a holographic display, or the like. On the date of the event, the proxy surrogate uses the telepresence display using the avatar of the principal person to attend the event and greet the attendees and during the event the proxy surrogate interacts with attendees, which may include participating in a song or musical tournament. At the end of the event the proxy surrogate thanks the attendees, coordinates with the caterer and venue provider and shuts off the telepresence display.

Figure 13:
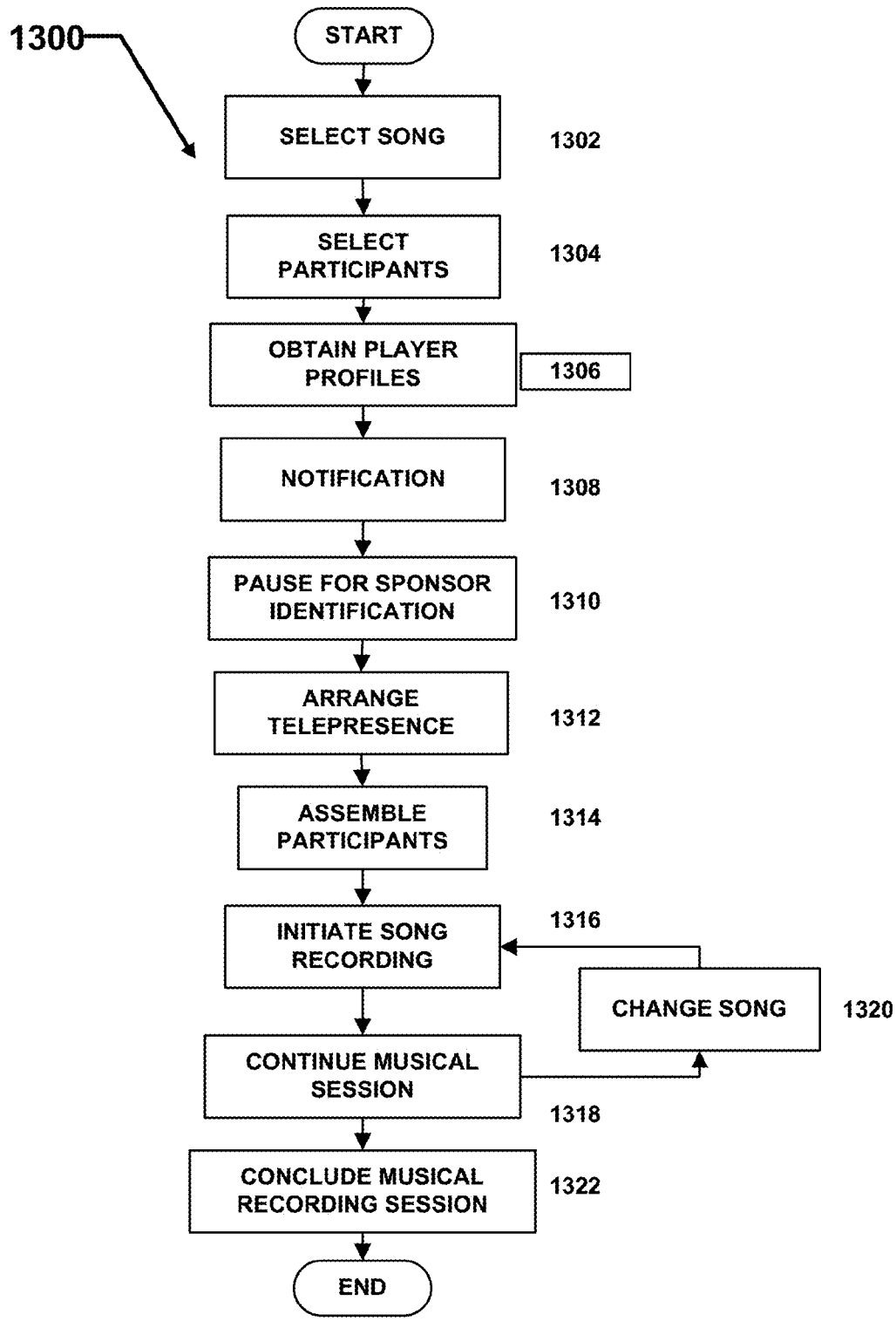

In some examples, the principal person can organize a musical event with specified participants to be sung at a specified future time. FIG. 13 shows a flowchart 1300 of the management of a musical event planned by the principal person. The principal person selects the type of song (1302), such as a serious song like hymn or anthem, a comedic song like "Ninety-nine Bottles", a musical show song like "Old Man River", or other single or multi-person song or musical tournament such as a karaoke-type contest, and selects the singers either directly (1304) or by description using profiles, if available (1306) and sends out invitations using a service such as EventBrite™ to collect RSVPs. A singer could be a person who is interested in musical the songs chosen or the surrogate of a person who had sufficient musical skill. The principal person then sets the date of the musical event possibly based on some triggering criterion, e.g., birthday party or graduation party (1308). In some examples, the principal person specifies the exact date of the musical event (e.g., Nov. 18, 2024). In some examples, the principal person indicates that the musical event is to occur on the date of an event that is associated with a specific date, such as the tenth birthday of the principal person's youngest nephew. In some examples, the principal person indicates that the music event is to occur on the date of an event whose date is not known at the time the principal person organizes the musical event. For instance, the principal person can indicate that the musical event is to occur on the night before the wedding of his oldest grandson, who is still unborn at the time the principal person organizes the musical event. The analytics engine can determine a date for the musical event based on the information provided by the principal person. In some cases, the principal person in advance or proxy surrogate of the principal person on the occasion can select an appropriate commercial sponsor for the musical contest based criteria such as the profiles of the singers, the type of songs chosen, the appropriate type of prize or prizes (1310). By sponsor, we mean an entity, such as a business, whose logo, slogan, or another identifier appears during the musical session (e.g., on the menus, illustrations of the song, cards of the lyrics, or on the screen). In some examples, the sponsor can offer prizes to one or more participants of the musical contest. In some examples, the sponsor can be chosen using predictive analytics. The principal person programs the sponsor identification (1310) to arrange for an internet-accessible telepresence display of the proxy surrogate of the principal person (1312) and the telepresence of the proxy surrogate of another person, if that proxy surrogate was chosen as a singer. The proxy surrogate uses the telepresence display to attend the event and greet the attendees and during the song the proxy surrogate interacts with singers, which may include musical the song or commenting on the song or on other topics. The proxy surrogate may arranges for the licensed original music and original vocal artist to be streamed and to provide encouraging words to new learners of the song. For example, a grandmother or the proxy surrogate of the grandmother may use the occasion to teach a granddaughter a song from the grandmother's era. The music event and the interaction with the proxy surrogate can be an audio session, a video session, or a multimedia session. For instance, the proxy surrogate may carry on conversations with the singers between different verses of the song, e.g., to share commentary on song musical strategies, the principal person's memories about the song or the singers, or other topics. The proxy surrogate can engage in a natural conversation with the singers on behalf of the principal person during the song, e.g., responding to questions or comments from the singers based on the life history information previously collected from the principal person.

The singers can be assembled together in a venue, e.g., a function room at Waldorf Astoria in New York (1314) or can be assembled virtually, e.g., over the internet. The proxy surrogate of the principal person then initiates the song (1316), which can involve recording the multimedia music event or displaying musical the music event to spectators (e.g., through a simulcast) or both. Initiating the song can involve assignment of stakes, choosing of teams, or other aspects. The music event continues to the conclusion of the song (1318) at which point a second or subsequent song may be initiated, e.g., upon request of the proxy surrogate (e.g., acting on instructions from the principal person to sing a specified number of songs) or upon request of one or more of the singers (1320). At the conclusion of the musical event (1322) the proxy surrogate thanks the attendees, distributes prizes to the song winner or winners, coordinates, if necessary, with the caterer and venue provider and shuts off the telepresence display after saving the musical session to the archive.

In some cases, the music event is not scheduled in advance by the principal person. Rather, one or more singers can access the musical system to request that the proxy surrogate sing a song on behalf of the principal person. In some cases, the singers can specify the song to be sung. In some cases, the singers can request that the proxy surrogate select a song on behalf of the principal person's favorite songs.

Figure 14:
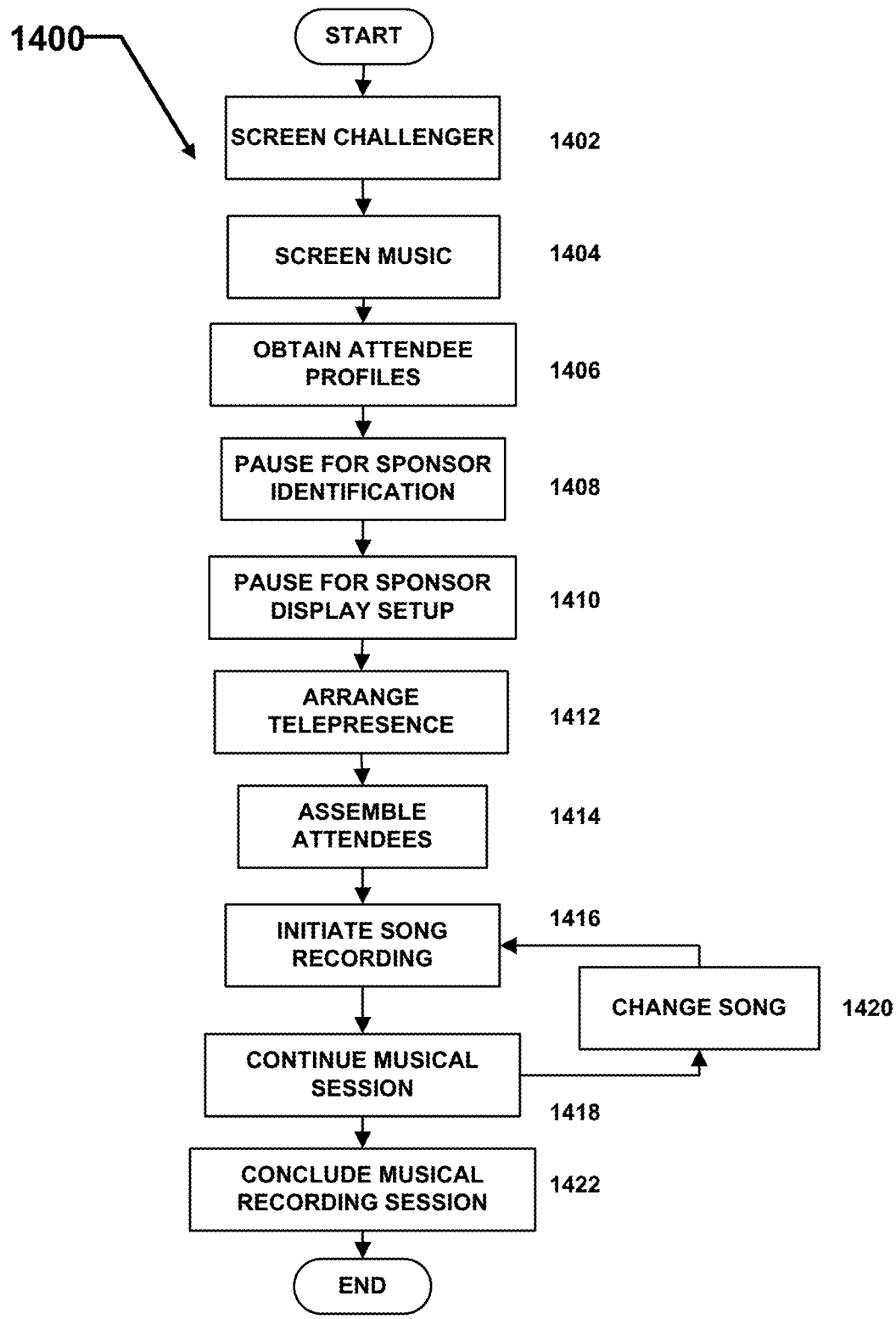

FIG. 14 shows a flowchart 1400 for managing a challenge to an interactive music event planned by the principal person. By a challenge to an interactive music event, we mean a request from a person to sing a song with the proxy surrogate of the principal person. In some examples, any person is permitted to challenge the proxy surrogate of the principal person to a song, e.g., any person that knows how to access the proxy surrogate of the principal person on the song rendering system. In some examples, only certain people (e.g., specified by the principal person) are permitted to challenge the proxy surrogate of the principal person to a song. For instance, the principal person would have previously programmed or designated a screening procedure for the type of person or entity that would be an acceptable challenger for a song (1402). For instance, the principal person could have directly specified one or more people or entities, for example named friends or relatives or a proxy surrogate of a friend or relative. The principal person could have specified a characteristic indicative of an identity of one or more people or entities, for example by specifying a class of people (for example, great grandchildren) permitted to challenge the proxy surrogate of the principal person. If the principal person specifies a characteristic that does not directly identify a person or entity, the analytics engine can determine whether the person requesting the song satisfies the characteristic specified by the principal person.

In some cases, the principal person would have previously programmed or designated a screening procedure for the type of acceptable song (1404), such as one known to the principal person, for example, a nation-specific song like "Star Spangled Banner", a religious song like "Amazing Grace", a chorus song like "Handel's Messiah" or "Auld Lang Syne", or other multi-person song or song tournament. In some cases, the analytics engine automatically determines which songs are acceptable, e.g., based on which songs the principal person sang when setting up the song rendering system.

On the occasion of the music event, (1406) the proxy surrogate of the principal person can determine (e.g., using predictive analytics) and select an appropriate commercial sponsor for the song based criteria such as the profiles of the singers, the type of song chosen, the appropriate type of prize or prizes to selected the most probable sponsor of the song. The proxy surrogate contacts the sponsor (1408) and upon receiving acceptance places the sponsor's logo on the song board display (1410). If the sponsor had authorized a prize for the song, the proxy surrogate of the principal person notifies the song singers or proceeds with an unsponsored song.

The proxy surrogate of the principal person then arranges for an internet-accessible telepresence display of the proxy surrogate of the principal person using the avatar of the principal person (1412) and the telepresence of the proxy surrogate of another Person using his avatar, if that proxy surrogate was chosen as a singer. If there is no video recording that satisfies the singer's request, the proxy surrogate can respond saying "Sorry, I don't feel like rendering right now." The proxy surrogate uses the telepresence display to attend the event and greet the attendees and during the song the proxy surrogate interacts with singers, which may include rendering the song or commenting on rendering or on other topics. The music event and the interaction with the proxy surrogate can be an audio session, a video session, or a multimedia session. For instance, the proxy surrogate may carry on conversations with the singers between verses of the song. e.g., to share commentary on song rendering strategies, the principal person's memories about the song or the singers, or other topics. The proxy surrogate can engage in a natural conversation with the singers on behalf of the principal person during the song, e.g., responding to questions or comments from the singers based on the life history information previously collected from the principal person.

The singers can be assembled together in a venue, e.g., a function room at Waldorf Astoria in New York (1414) or can be assembled virtually. e.g., over the internet. The proxy surrogate of the principal person then initiates the song (1416) which can involve recording the multimedia music event or displaying music event to spectators or both. Initiating the song can involve assignment of stakes or choosing of teams or other aspects. The music event continues to the conclusion of the song (1418) at which point a second or subsequent song may be initiated (1420), e.g., upon request of the proxy surrogate or one or more of the singers. At the conclusion of the musical event (1422) the proxy surrogate thanks the attendees, distributes prizes to the song winner or winners, coordinates, if necessary, with the caterer and venue provider and shuts off the telepresence display after saving the musical session to the archive database (316A, . . . , 316N) so that it forms part of the history of the principal person.

The platform may be used for more than recreational music or sponsor marketing. For instance, the music platform can be used in business applications, e.g., for company songs to encourage workers during product development and release; in government applications, e.g., for patriotic rendering of political songs, such as military war songs; or in public health applications, e.g., for making memorable containment scenarios of infectious diseases, such as Ebola; or in other applications.

Figure 15:
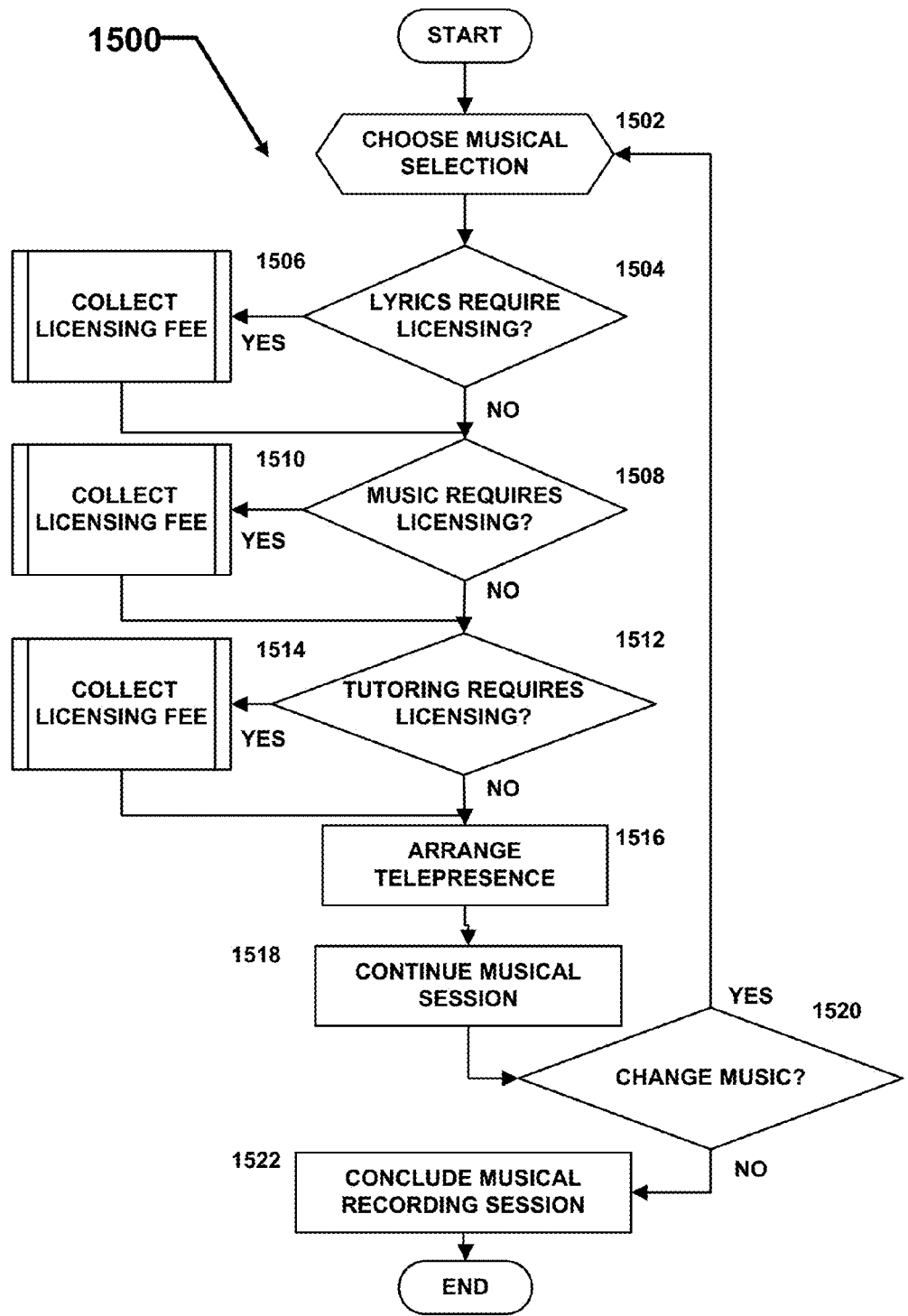

FIG. 15 is an exemplary flowchart 1500 for licensing lyrics, instrument content and instruction for selected songs and tunes to be incorporated into the multimedia presentation arranged at future event by direction of the principal person 102 or the proxy surrogate of the principal person. The proxy surrogate may arrange for the licensed original music and original vocal artist to be streamed, and to provide encouraging words to new learners of the song. For example, a grandfather or the proxy surrogate of the grandfather may use the occasion to teach a grandson how to play a guitar tune from the grandfather's era after the manner found on YouTube.com ("How to play guitar for beginners: playing . . . "—YouTube [www.youtube.com/watch?v=vSakoBvdIvU]). After the initial choice of a musical selection appropriate to the event is made (1502), if the lyrics are not original with the principal person the analytics engine determines who holds the copyright requiring licensing (1504). Upon determining the entity holding the unexpired copyright the then current licensing fee is paid, for example, by bank transfer of funds (1506). Subsequently if the musical score is not original with the principal person, the analytics engine determines who holds the copyright requiring licensing (1508). Upon determining the entity holding the unexpired copyright the then current licensing fee is paid, for example, by bank transfer of funds (1510). Subsequently, based upon the musical selection, for instance, the level of difficulty in singing or playing, and the level of sophistication of the audience or of an intended individual in the audience, for example, a 5-year old great granddaughter of the principal person, a decision is made regarding the need for tutoring, which may take the form of existing instructional multimedia lessons or simply in the form of encouraging words from the original artist or a celebrity (1512). The analytics engine determines the required fee for services, which are paid, for instance by bank transfer of funds (1514). The proxy surrogate arranges for and initiates the telepresence display (1516), which may include the avatar of the principal person and avatars of one or more tutors and one or more musical artists. After the presentation of the selected musical selection (1518) a decision is made by proxy surrogate using the analytics engine to choose another musical selection or not (1520). If decision to continue with another selection is made the process continues (1502). If the decision to finish the multimedia presentation is made then the recording of the musical session concludes and is archived (1522).

As desired, the music event social network may include more or fewer than the components illustrated. The music event social network is described above with reference to block and flow diagrams of systems, methods, apparatuses, and/or computer program products according to examples. In some instances, the publisher and reader users may access the social network by desktop or laptop computers. In some embodiments, the publisher and reader users may access the social network by mobile devices such as smart phones. In some embodiments, the publisher and reader users may access the social network by tablet computers or any commercial computing device connected to the internet. In some cases, the social network may be constructed to operate on the internet independent of existing social networks. The music event social network may operate using existing social networks, e.g., Facebook, Google+, or Yammer as platforms using existing application interfaces open to website developers.

Generally, the intelligent automated assistant techniques disclosed herein may be implemented on hardware or a combination of software and hardware. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Software/hardware hybrid implementation(s) of at least some of the intelligent automated assistant embodiment(s) disclosed herein may be implemented on a programmable machine selectively activated or reconfigured by a computer program stored in non-transitory memory. Such network devices may have multiple network interfaces which may be configured or designed to utilize different types of network communication protocols. A general architecture for some of these machines may appear from the descriptions disclosed herein. According to specific embodiments, at least some of the features and/or functionalities of the various intelligent automated assistant embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, vocal and music player, or any other suitable electronic device, router, switch, or the like, or any combination thereof. In at least some embodiments, at least some of the features and/or functionalities of the various intelligent automated assistant embodiments disclosed herein may be implemented in one or more virtualized computing environments (e.g., network computing clouds, or the like).

One or more blocks of the block diagrams and flow diagrams, and combinations of blocks in the block diagrams and flow diagrams, respectively, can be implemented by computer-executable program instructions. Some blocks of the block diagrams and flow diagrams may not necessarily need to be performed in the order presented, or may not necessarily need to be performed at all, in some cases.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means that implement one or more functions specified in the flow diagram block or blocks. As an example, embodiments may provide for a computer program product, comprising a non-transitory computer-usable medium having a non-transitory computer-readable program code or program instructions embodied therein, said non-transitory computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the music event social network has been described in connection with certain examples, is the system is not limited to the disclosed embodiments, but on the contrary, includes various modifications and equivalent arrangements. Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i. e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or communication data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a vocal and music console, a Global Positioning System (GPS) receiver, or a portable storage device, e.g., a universal serial bus (USB) flash drive, to name just a few.

Non-transitory computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a displaying device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Other implementations are also within the scope of the following claims.

The invention claimed is:

1. A computer-implemented method comprising:
   automatically generating, by computer, a digital representation of a first person based on one or more of an appearance, a voice, or a behavior of the first person;
   automatically, by computer, engaging with a second person to render a song on behalf of the first person using the computer-generated digital representation of the first person, the rendering of the song being based on an automated analysis of one or more of a musical style, a musical ability, and a musical behavior of the first person; and
   on behalf of the first person and using the computer-generated digital representation of the first person, while rendering the song with the second person, providing, by computer, a natural language response to a question or statement from the second person based on information received from or about the first person.

2. The method of claim 1, comprising presenting the digital representation of the first person.

3. The method of claim 2, in which the digital representation of the first person includes one or more of an audio representation, a still image representation, or a video representation of the first person.

4. The method of claim 1, in which engaging with the second person to perform the song comprises rendering the song with the second person at a level of rendering consistent with the musical ability of the first person.

5. The method of claim 4, comprising determining the musical ability of the first person.

6. The method of claim 4, comprising determining the musical ability of the first person based on a previous observation of the first person rendering the song.

7. The method of claim 1, in which engaging with the second person to render the song includes presenting a gesture or physical action during the rendering of the song.

8. The method of claim 7, comprising presenting the gesture or physical action in a video or multimedia display.

9. The method of claim 7, comprising determining the gesture or physical action based on information received from or about the first person.

10. The method of claim 9, comprising determining the gesture or physical action based on a previous observation of the first person rendering the song.

11. The method of claim 7, comprising presenting the gesture or physical action in response to a question, statement, or action from the second person.

12. The method of claim 11, comprising determining the gesture or physical action based on the question, statement, or action from the second person.

13. The method of claim 7, comprising presenting the gesture or physical action in response to an event that occurred during the song.

14. The method of claim 1, comprising presenting a still or video image of the first person while rendering the song with the second person.

15. The method of claim 1, comprising inviting the second person to sing the song.

16. The method of claim 15, comprising determining an identity of the second person based on information indicative of the identity of the second person previously provided by the first person.

17. The method of claim 1, comprising receiving a request from the second person to render the song.

18. The method of claim 17, comprising determining whether to accept the request from the second person.

19. The method of claim 18, comprising accepting the request if information previously provided by the first person includes information indicative of the identity of the second person.

20. The method of claim 1, in which providing the natural language response comprises providing at least a portion of a digitized life history previously provided by the first person.

21. The method of claim 20, comprising determining the portion of the digitized life history based on the question or statement from the second person.

22. The method of claim 1, in which providing the natural language response comprises providing the natural language response in a manner associated with the first person.

23. The method of claim 22, comprising determining the manner in which to provide the natural language response based on the information received from or about the first person.

24. The method of claim 22, in which the manner associated with the first person includes one or more of a manner of speaking by the first person, a manner of rendering the song by the first person or a gesture used by the first person.

25. The method of claim 24, in which the manner of speaking includes one or more of voice of the first person, an accent of the first person, or a tone of voice of the first person.

26. The method of claim 1, comprising engaging with the second person to render the song on behalf of the first person when the first person is no longer alive or no longer competent.

27. A system comprising:
a processor coupled to a memory, the processor and memory configured to:
automatically generate, by computer, a digital representation of a first person based on one or more of an appearance, a voice, or a behavior of the first person;
automatically, by computer, engage with a second person to render a song on behalf of the first person using the computer-generated digital representation of the first person, the rendering of the song being based on an automated analysis of one or more of a musical style, a musical ability, and a musical behavior of the first person; and
on behalf of the first person and using the computer-generated digital representation of the first person, while rendering the song with the second person, providing, by computer, a natural language response to a question or statement from the second person based on information received from or about the first person.

28. A non-transitory computer readable storing medium storing instructions for causing a computing system to:
automatically generate, by computer, a digital representation of a first person based on one or more of an appearance, a voice, or a behavior of the first person;
automatically, by computer, engage with a second person to render a song on behalf of the first person using the computer-generated digital representation of the first person, the rendering of the song being based on an automated analysis of one or more of a musical style, a musical ability, and a musical behavior of the first person; and
on behalf of the first person and using the computer-generated digital representation of the first person, while rendering the song with the second person, provide, by computer, a natural language response to a question or statement from the second person based on information received from or about the first person.

* * * * *